United States Patent
Ben Yehuda et al.

(10) Patent No.: US 9,207,519 B1
(45) Date of Patent: Dec. 8, 2015

(54) SELF-PHOTOGRAPHING MOUNT DEVICE

(71) Applicants: Iftach Ben Yehuda, Bitan Aharon (IL);
Yariv Ben-Yehuda, Bitan Aharon (IL)

(72) Inventors: Iftach Ben Yehuda, Bitan Aharon (IL);
Yariv Ben-Yehuda, Bitan Aharon (IL)

( * ) Notice: Subject to any disclaimer, the term of this patent is extended or adjusted under 35 U.S.C. 154(b) by 0 days.

(21) Appl. No.: 14/730,293

(22) Filed: Jun. 4, 2015

Related U.S. Application Data

(60) Provisional application No. 62/008,000, filed on Jun. 5, 2014.

(51) Int. Cl.
*G03B 17/00* (2006.01)
*G03B 17/56* (2006.01)

(52) U.S. Cl.
CPC ............ *G03B 17/561* (2013.01); *G03B 17/563* (2013.01)

(58) Field of Classification Search
USPC ............................ 396/420–425, 428; 348/376
See application file for complete search history.

(56) References Cited

U.S. PATENT DOCUMENTS

| | | | | |
|---|---|---|---|---|
| 4,727,390 | A * | 2/1988 | Brown | F16M 13/04 396/420 |
| 5,768,645 | A | 6/1998 | Kessler | |
| 7,706,673 | B1 * | 4/2010 | Staudinger et al. | 396/58 |
| 7,997,808 | B1 * | 8/2011 | Smith | 396/422 |
| 8,780,263 | B2 | 7/2014 | Orf | |
| 8,915,660 | B1 * | 12/2014 | Ben Yehuda et al. | 396/420 |
| 2006/0257138 | A1 * | 11/2006 | Fromm | F16M 13/04 396/420 |
| 2007/0292125 | A1 | 12/2007 | Saxton | |
| 2009/0003820 | A1 | 1/2009 | Law et al. | |
| 2009/0003822 | A1 | 1/2009 | Tyner | |
| 2010/0259619 | A1 * | 10/2010 | Nicholson | 348/158 |
| 2012/0207464 | A1 | 8/2012 | Sherwood | |
| 2013/0004153 | A1 | 1/2013 | McKee et al. | |
| 2014/0054909 | A1 | 2/2014 | Kannaka | |

OTHER PUBLICATIONS

Notice of Allowance Dated Sep. 29, 2014 From the US Patent and Trademark Office Re. U.S. Appl. No. 14/304,937.

* cited by examiner

*Primary Examiner* — Clayton E LaBalle
*Assistant Examiner* — Warren K Fenwick

(57) ABSTRACT

A self-photographing mount device for holding a camera equipped user device at a distance from a user, comprising: a mounting structure having at least two corner mounting elements for mounting a camera equipped user device in parallel to a mounting plane; an extendable shaft having a handle at a proximal end thereof; and a hinge mounted on one of the at least two corner mounting elements to allow pivotal rotation of the extendable shaft from a folded position to an open position; when in the folded position, the extendable shaft is adjacent to the mounting plane and parallel to a diagonal of a back panel of the camera equipped user device; and when in the open position, the extendible shaft forms a wide angle with the mounting plane.

14 Claims, 7 Drawing Sheets

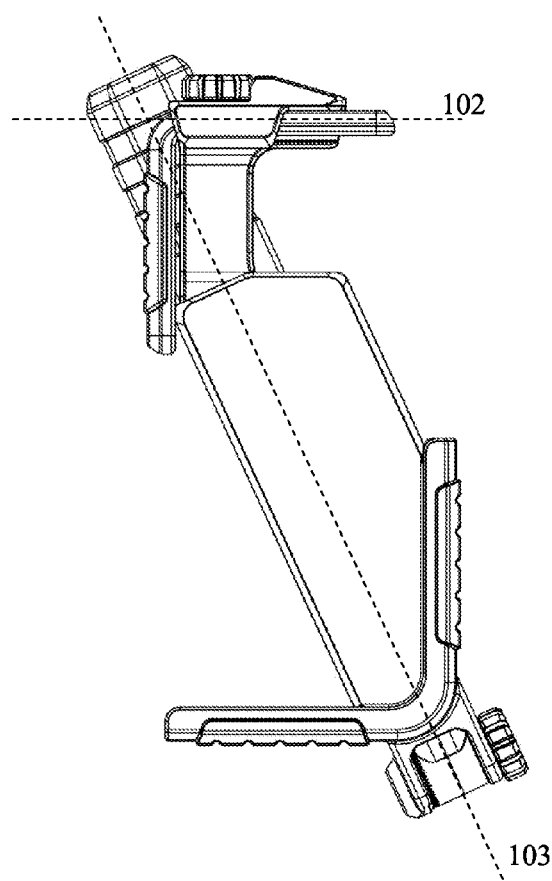
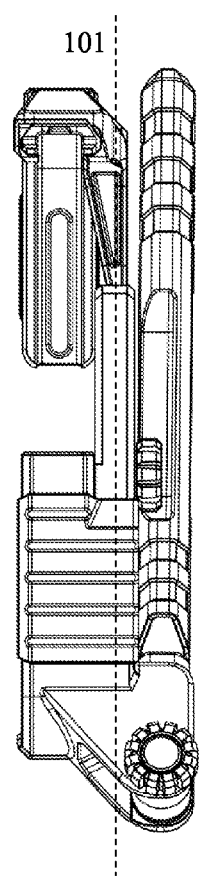
FIG. 4A  FIG. 4B
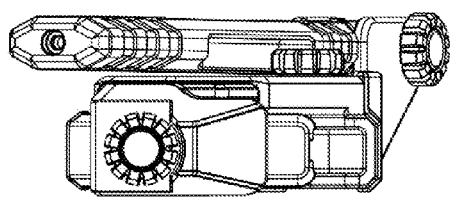
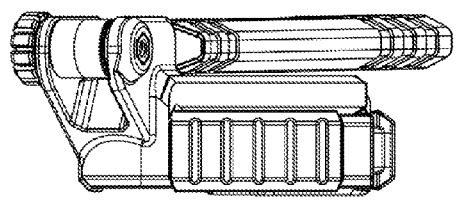
FIG. 4C  FIG. 4D

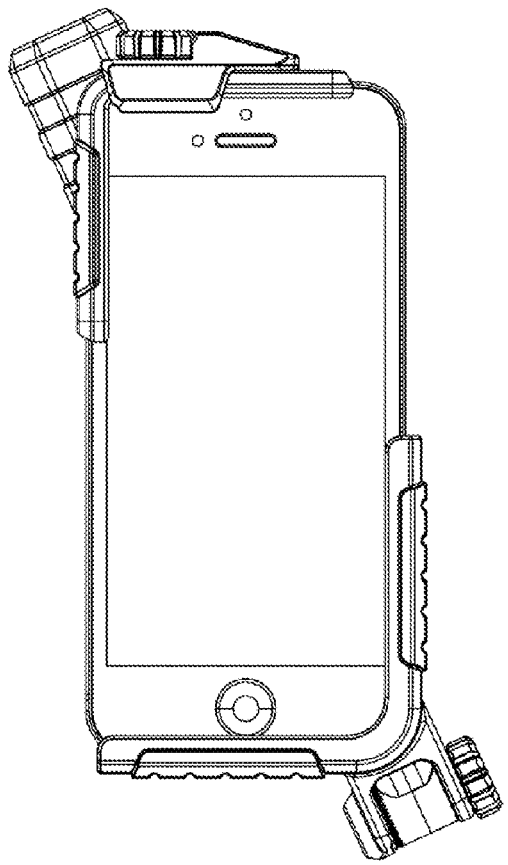 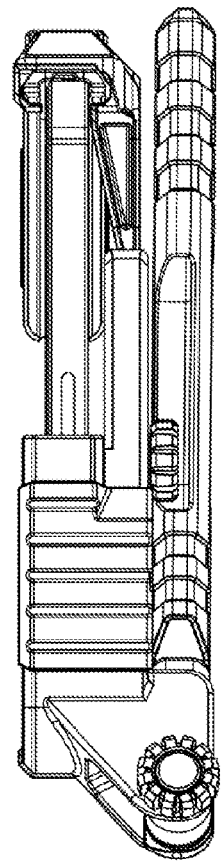
FIG. 6A  FIG. 6B
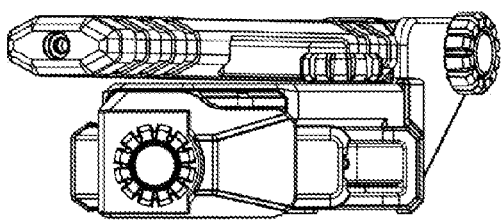 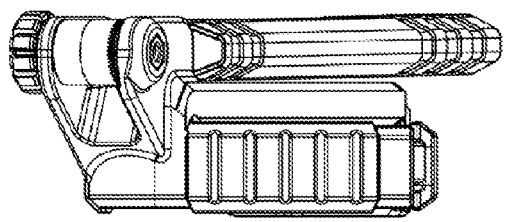
FIG. 6C  FIG. 6D

SELF-PHOTOGRAPHING MOUNT DEVICE

RELATED APPLICATION

This application claims the benefit of priority under 35 USC 119(e) of U.S. Provisional Patent Application No. 62/008,000 filed Jun. 5, 2014, the contents of which are incorporated herein by reference in their entirety.

FIELD AND BACKGROUND OF THE INVENTION

The present invention, in some embodiments thereof, relates to a self-photographing mount device and, more particularly, but not exclusively, to a self-photographing mount device for holding a camera equipped user device at a distance from a user.

When a user wishes to take a photograph of himself using a camera equipped user device, such as a mobile phone, the user has to hold the mobile phone at a distance from himself. To extend the distance the user may achieve using his arm, a self-photographing mount device may be used.

Existing self-photographing mount devices in include a mounting structure connected to a shaft having a handle. Some of the mount devices include an extendable shaft. Some of the mount devices include a shaft having button to operate the camera equipped user device.

SUMMARY OF THE INVENTION

According to an aspect of some embodiments of the present invention there is provided a self-photographing mount device for holding a camera equipped user device at a distance from a user, comprising: a mounting structure having at least two corner mounting elements for mounting a camera equipped user device in parallel to a mounting plane; an extendable shaft having a handle at a proximal end thereof; and a hinge mounted on one of the at least two corner mounting elements to allow pivotal rotation of the extendable shaft from a folded position to an open position; when in the folded position, the extendable shaft is adjacent to the mounting plane and parallel to a diagonal of a back panel of the camera equipped user device; and when in the open position, the extendible shaft forms a wide angle with the mounting plane.

Optionally, the mounting structure comprises: a first corner mounting element; a second corner mounting element linearly moveable along a line to adjust at least one of a width and a length of the camera equipped user device; and a diagonal support element connecting between the first and second corner mounting elements and diagonally adjacent to a back of the camera equipped user device, the diagonal support element is linearly moveable along a line to adjust a diagonal length of the camera equipped user device.

Optionally, the mounting structure comprises: a first and a second corner mounting elements; and a diagonal support element connecting between the first and second corner mounting elements and diagonally adjacent to a back of the camera equipped user device, the diagonal support element is linearly moveable along a line to adjust a diagonal length of the camera equipped user device; wherein each one of the first and second corner mounting elements are connected to the diagonal support element by a hinge, so the first and second corner mounting elements are each rotated on the hinge to adjust to a diagonal of the camera equipped user device.

Optionally, the camera equipped user device is a mobile phone.

Optionally, the camera equipped user device is a pocket camera.

Optionally, the extendable shaft comprises at least one button to operate the camera equipped user device.

Optionally, the hinge is locked in the open position and in the folded position by a fastener.

According to an aspect of some embodiments of the present invention there is provided a self-photographing mount device for holding a camera equipped user device at a distance from a user, comprising: a mounting structure for mounting a camera equipped user device, comprising: a first corner mounting element; a second corner mounting element linearly moveable along a line to adjust at least one of a width and a length of the camera equipped user device; and a diagonal support element connecting between the first and second corner mounting elements and diagonally adjacent to a back of the camera equipped user device, the diagonal support element is linearly moveable along a line to adjust a diagonal length of the camera equipped user device; and an extendable shaft having a handle at a proximal end thereof, connected to one of the first and second corner mounting elements by a hinge allow pivotal rotation of the extendable shaft from a folded position to an open position.

Optionally, when in the folded position, the extendable shaft is about parallel and adjacent to the diagonal support element and when in the open position, the extendible shaft forms a wide angle with the mounting plane.

Optionally, at least one of the first corner mounting elements, the second corner mounting element and the diagonal support element is locked by a fastener.

Optionally, at least one of the first corner mounting elements, the second corner mounting element and the diagonal support element is locked by a mechanism having discrete possible positions along a line.

Optionally, at least one of the first corner mounting elements, the second corner mounting element and the diagonal support element is locked by a spring mechanism and by resistance created by the mounted camera equipped user device.

Optionally, the second corner mounting element is linearly moveable along a line by moving inside a track.

Optionally, the diagonal support element is linearly moveable along a line by including an inner diagonal element moving inside an outer diagonal element.

Optionally, at least one of the first and second corner mounting elements comprises two perpendicular straight segments, each one of the straight segments is adjacent and parallel to a side wall of the mounted camera equipped user device.

According to an aspect of some embodiments of the present invention there is provided a method for adjusting a self-photographing mount device, comprising: adjusting a diagonal support element of a camera equipped user device mounting structure to fit a diagonal length of the camera equipped user device between a first corner mounting element and a second corner mounting element; adjusting the first corner mounting element to fit at least one of a width and a length of the camera equipped user device; and opening a hinge connecting an extendable shaft to one of the first and second corner mounting elements from a folded position to an open position so the extendable shaft may be used to hold the mounting structure.

Optionally, the method further comprises: extending the extendable shaft to increase a distance between the camera equipped user device and a user.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 4A, 4B, 4C and 4D are schematic illustrations of different views of a self-photographing mount device, according to some embodiments of the present invention;

FIGS. 6A, 6B, 6C and 6D are schematic illustrations of different views of a self-photographing mount device mounting an iPhone 5 mobile phone, according to some embodiments of the present invention.

DESCRIPTION OF EMBODIMENTS OF THE INVENTION

Figure 1:
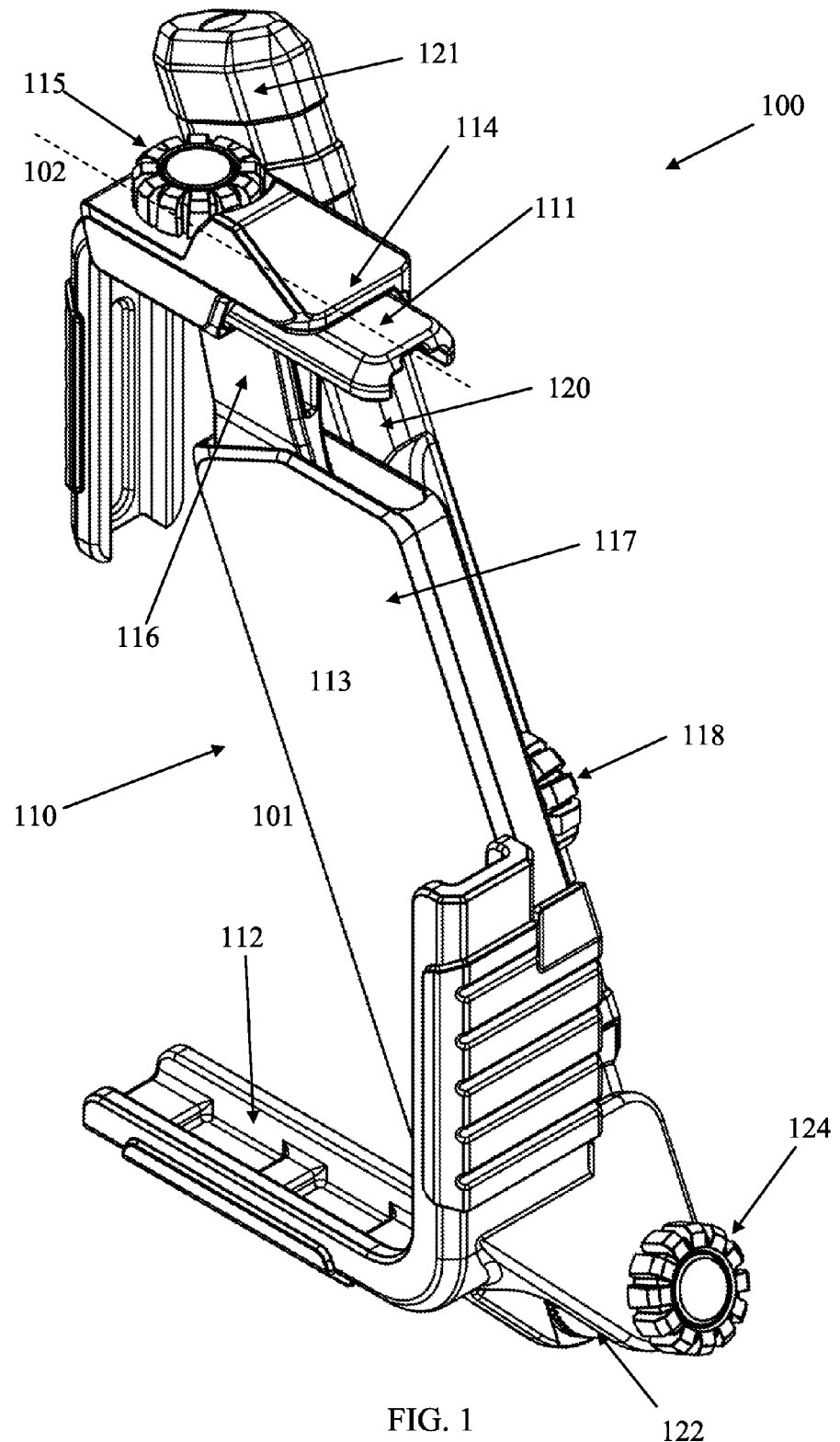
FIG. 1 is a schematic illustration of a self-photographing mount device in a folded position, according to some embodiments of the present invention.

The present invention, in some embodiments thereof, relates to a self-photographing mount device and, more particularly, but not exclusively, to a self-photographing mount device for holding a camera equipped user device at a distance from a user.

The camera equipped user device may be any type of portable device equipped with photographing capabilities, for example, a pocket camera, a mobile phone and/or any other device.

According to some embodiments of the present invention, there is provided a self-photographing mount device having a mounting structure with at least two corner mounting elements for mounting a camera equipped user device in parallel to a mounting plane; an extendable shaft having a handle at a proximal end thereof; and hinge mounted on one of the corner mounting elements to allow pivotal rotation of the extendable shaft from a folded position in parallel to the mounting structure to an open position, forming a wide angle with the mounting plane of the mounted self-photographing mount device. When in folded position, the mount device is not in use and is folded to a compact form where the extendable shaft is adjacent to the mounting plane and parallel to a diagonal of a back panel of the camera equipped user device. When in open position, the mount device may be used for self-photographing when a user holds the handle of the extendable shaft. In open position the extendible shaft forms a wide angle with the mounting plane of the mounting structure.

According to some embodiments of the present invention, there is provided a self-photographing mount device having a mounting structure that comprises: a first corner mounting element; a second corner mounting element linearly moveable along a line to adjust the width or the length of the camera equipped user device; and a diagonal support element connecting between the corner mounting elements and diagonally adjacent to the back of the camera equipped user device and is linearly moveable along a line to adjust the diagonal length of the camera equipped user device. The linearly moveable parts of the mounting structure allow any of a plurality of camera equipped user devices with various sizes to be mounted on the mounting structure by simple adjustment of the linearly moveable parts. The mount device also includes an extendable shaft with a handle at a proximal end thereof, connected to one of the corner mounting elements by a hinge to allow pivotal rotation of the extendable shaft to a folded position.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
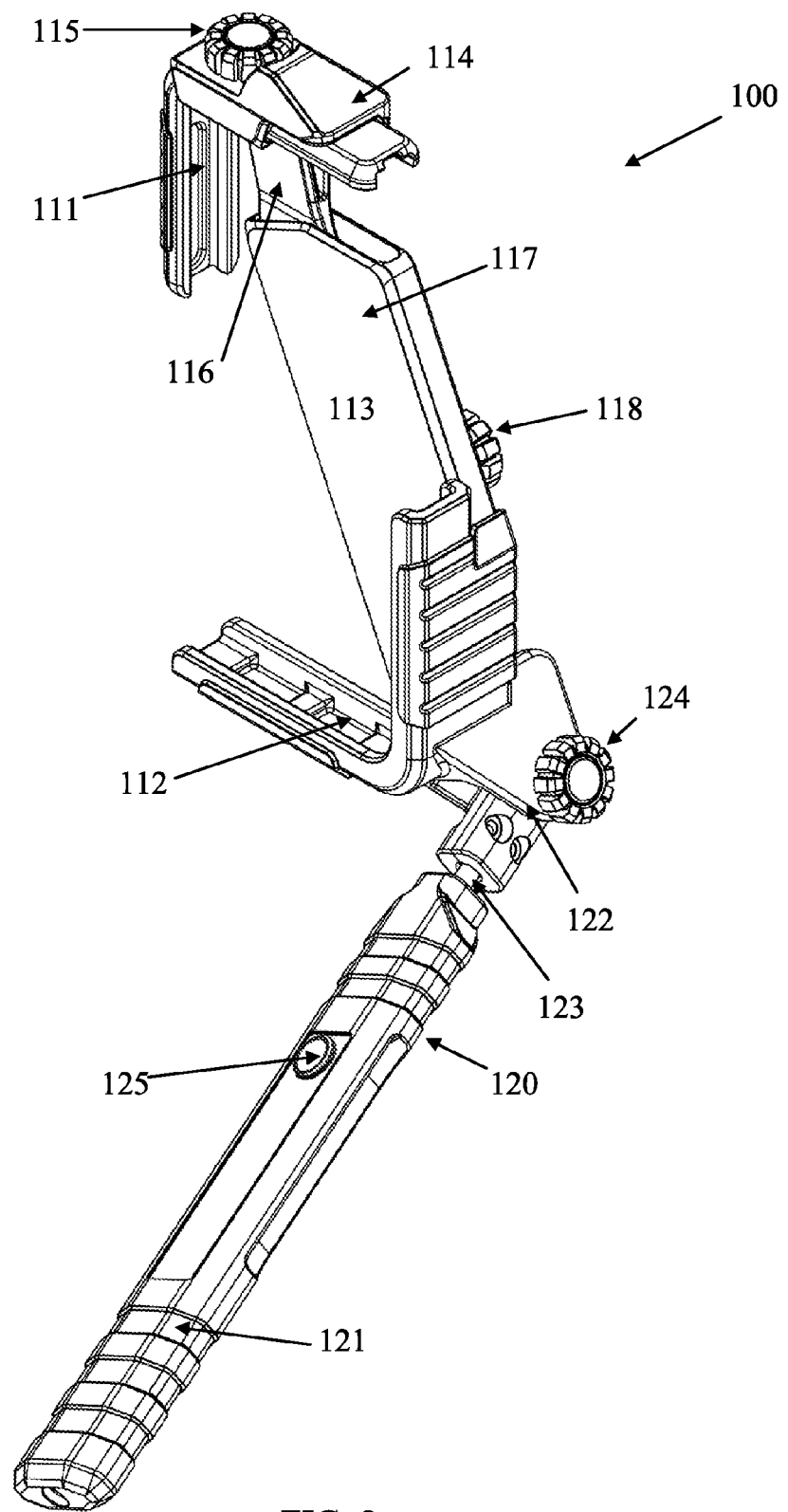
FIG. 2 is a schematic illustration of a self-photographing mount device in an open position, according to some embodiments of the present invention.

Referring now to the drawings, FIG. 1 is a schematic illustration of a self-photographing mount device in a folded position, according to some embodiments of the present invention. Reference is also made to FIG. 2, which is a schematic illustration of a self-photographing mount device in an open position, according to some embodiments of the present invention.

Mount device 100 may be made of any material, for example, plastic, metal and/or any other material or combination thereof.

Mount device 100 includes a mounting structure 110 having at least two corner mounting elements 111 and 112 for mounting a camera equipped user device in parallel to a mounting plane 101. Corner mounting element 111 is linearly moveable along a line 102 to adjust to the width of the camera equipped user device.

Optionally, some or all of the corner mounting elements are L-shaped, having two perpendicular straight segments. Each straight segment is adjacent and parallel to a side wall of the camera equipped user device.

Figure 3:
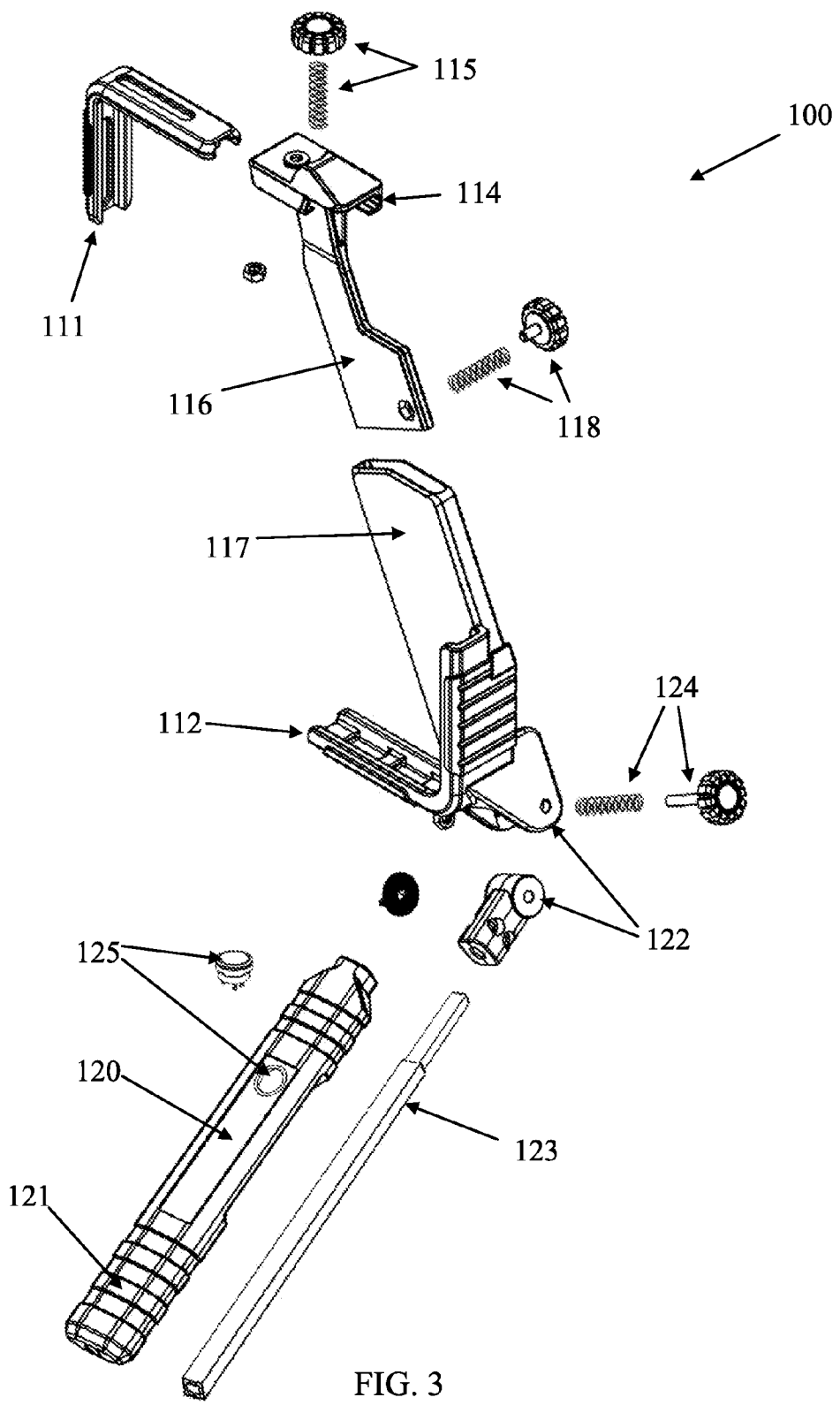
FIG. 3 is an exploded view drawing of a self-photographing mount device in an open position, according to some embodiments of the present invention.

Reference is now made to FIG. 3 which is an exploded view drawing of a self-photographing mount device in an open, position according to some embodiments of the present invention. Reference is also made to FIGS. 4A, 4B, 4C and 4D which are schematic illustrations of different views of a self-photographing mount device, according to some embodiments of the present invention.

Optionally, the linear movement of corner mounting element 111 is obtained by moving corner mounting element 111 inside a track 114 built into mounting structure 110. The linear movement of corner mounting element 111 may be also be obtained by any other mechanical structure, for example, a linear-motion bearing, rack and pinion and/or any other structure.

Optionally, corner mounting element 111 is locked in position along the line of linear movement by a fastener 115 so corner mounting element 111 cannot move along a line 102 without opening the locking. Fastener 115 may be any type of mechanical element that tightens corner mounting element 111 in position, such as a screw, a screw with a spring, a ratchet, a quick release lever and/or any other mechanism. Optionally, corner mounting element 111 is locked by a mechanism having discrete possible positions along a line 102. For example, a linear retractor mechanism pulled by a spring and positioned by teeth. Optionally, corner mounting element 111 is locked in position by a spring mechanism pulling corner mounting element 111 into track 114 and by resistance created by the mounted camera equipped user device.

Figure 5:
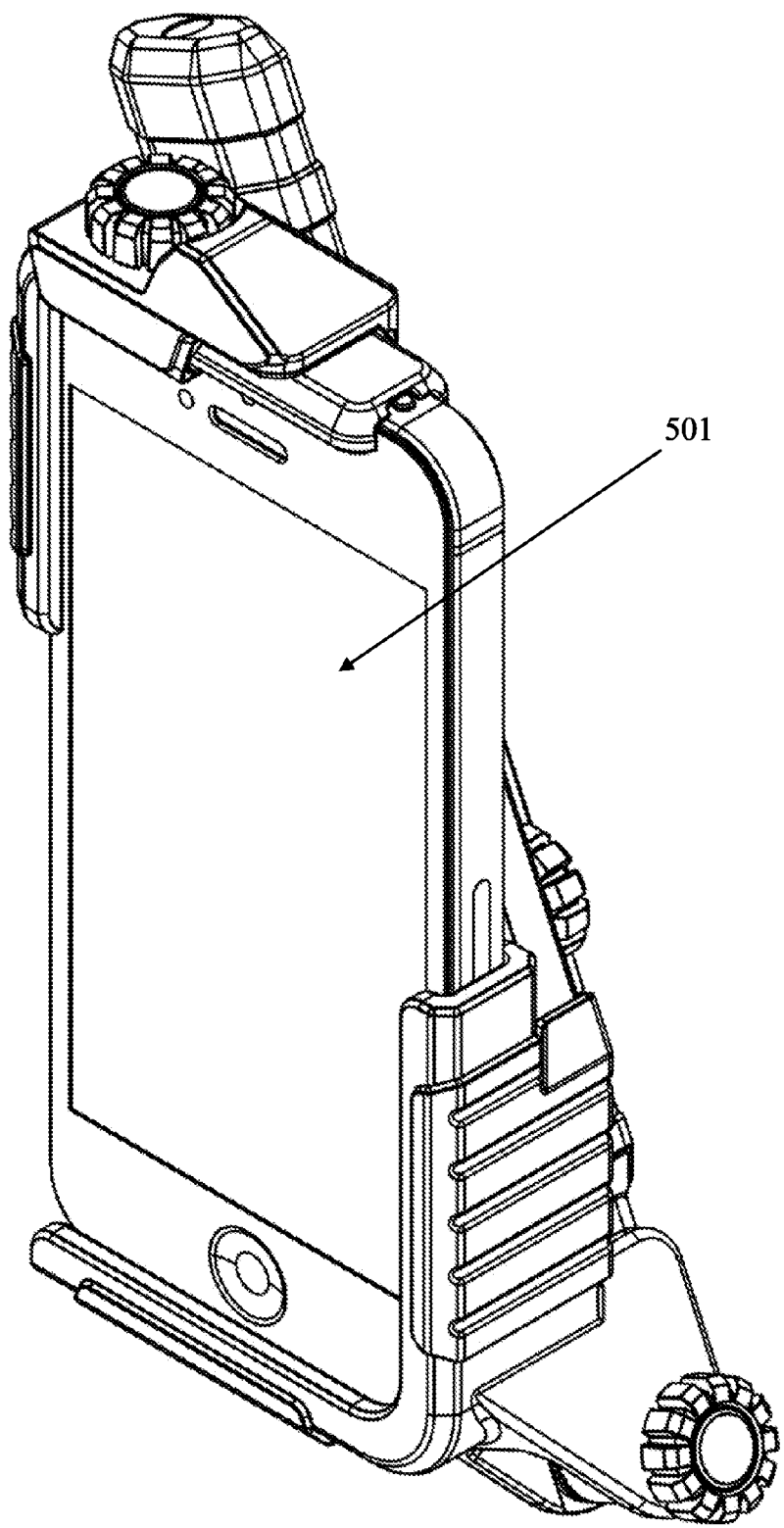
FIG. 5 is a schematic illustration of a self-photographing mount device mounting an iPhone 5 mobile phone, according to some embodiments of the present invention.

Reference is now made to FIG. 5 which is a schematic illustration of a self-photographing mount device mounting an iPhone 5 mobile phone, according to some embodiments of the present invention. Reference is also made to FIGS. 6A, 6B, 6C and 6D which are schematic illustrations of different views of a self-photographing mount device mounting an iPhone 5 mobile phone, according to some embodiments of the present invention.

Mounting structure 110 also includes a diagonal support element 113 connecting between corner mounting element 111 and corner mounting element 112. Diagonal support element 113 is diagonally adjacent to the back of the camera equipped user device 501 and is linearly moveable along a line 103 to adjust to the diagonal length of camera equipped user device 501. Diagonal support element 113 has flat structure and is built along mounting plane 101.

Optionally, diagonal support element 113 includes an inner diagonal element 116 and an outer diagonal element 117. The linear movement of diagonal support element 113 is obtained by moving inner diagonal element 116 inside outer diagonal element 117. The linear movement may also be obtained by any other mechanical structure, as described above.

Optionally, outer diagonal element 117 of diagonal support element 113 is connected to corner mounting element 112, forming an acute angle with the straight segments of corner mounting element 112.

Optionally, diagonal support element 113 is locked in position, so inner diagonal element 116 cannot move inside outer diagonal element 117 without opening the locking, by a fastener 118 of any type and/or a mechanism, as described above.

Mounting structure 110 may be of any size generally fitting common camera equipped user devices, for example, 4, 6, 10, 15 centimeters wide and/or long and/or any other shorter, longer or intermediate size.

Optionally, corner mounting element 111 is not linearly moveable, and the adjustment of mounting structure 110 is performed by other movements. Optionally, corner mounting elements 111 and 112 are connected to diagonal support element 113 by hinges, so the angles between corner mounting elements 111 and 112, and diagonal support element 113 is adjustable to the diagonal of camera equipped user device 501. When a different camera equipped user device is mounted, corner mounting elements 111 and 112 are rotated on the hinges so the angles are adjusted to the different camera equipped user device.

Mount device 100 also includes an extendable shaft 120 having a handle 121 at a proximal end thereof; and a hinge 122 mounted on corner mounting element 112 to allow pivotal rotation of extendable shaft 120 from a folded position as shown in FIG. 1 to an open position as shown in FIG. 2.

Optionally, extendable shaft 120 is extended by having an inner shaft 123 moving inside extendable shaft 120 to create telescopic movement so when not extended, inner shaft 123 is inside extendable shaft 120 and when extended inner shaft 123 is protruding from extendable shaft 120. Extendable shaft 120 may also be extended by any other mechanical structure, for example, an inner shaft moving inside an extendable shaft by a screw thread, an extendable shaft foldable via one or more joints, a flexible accordion-like extendable shaft and/or any other structure.

Extendable shaft 120 may be of any length, when extended or when not extended, for example, 10, 20, 30, 50 centimeters and/or any other shorter, longer or intermediate length. Handle 121 may be of any thickness fitting a user's grip, for example, 2, 3, 5 centimeters wide and/or any other shorter, longer or intermediate size.

Optionally, hinge 122 is locked in either folded position or open position by a fastener 124. Fastener 124 may be, for example, a screw that is inserted to hinge 122 and/or any other mechanical element, as described above.

Optionally, handle 121 is not round, with non-circular cross-sectional profile, to prevent extendable shaft 120 from rolling while being held by a user. The cross-sectional profile of handle 121 may be, for example, rectangular, elliptic and/or any other shape.

Optionally, extendable shaft 120 includes at least one button 125 to operate camera equipped user device 501. For example, button 125 may be used to activate the taking of the self-photograph. This may be performed, for example, by initiating a command to camera equipped user device 501 using an electronic unit included in mount device 100. The electronic unit may be, for example, a printed circuit, an electronic chip, a communication device, a processing unit and/or any other electronic element. The command may be sent, for example, by wireless communication such as wireless local area network (WLAN) protocol such as Wireless Fidelity (WiFi™) and/or a wireless personal area network (WPAN) such as Bluetooth™ protocol.

When extendable shaft 120 is in folded position, it is adjacent to mounting plane 101 and parallel to a diagonal of a back panel of camera equipped user device 501. When extendable shaft 120 is in open position, it forms a wide angle with mounting plane 101. The angle may be any wide angle, for example, 95, 130, 160 degrees and/or any other smaller, larger or intermediate angle.

Figure 7:
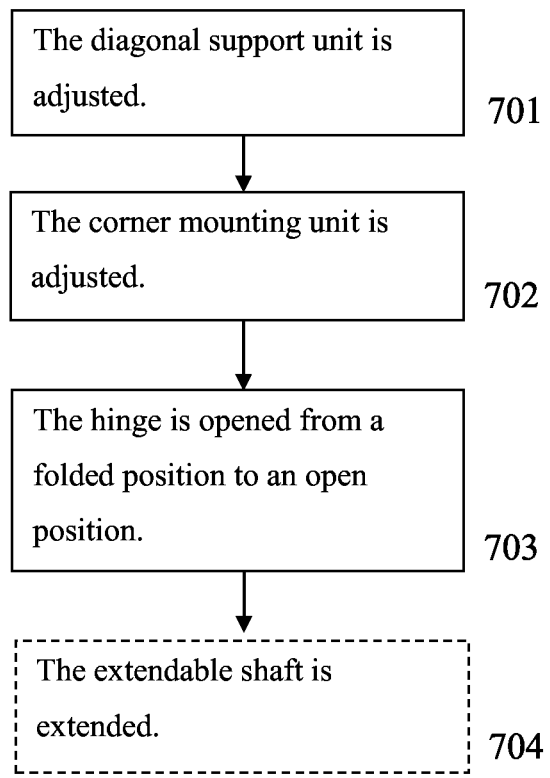
FIG. 7 is a flowchart schematically representing a method for adjusting a self-photographing mount device, according to some embodiments of the present invention.

Reference is now made to FIG. 7 which is a flowchart schematically representing a method for adjusting a self-photographing mount device, according to some embodiments of the present invention.

First, as shown at 701, diagonal support element 113 is adjusted to fit a diagonal length of camera equipped user device 501 between corner mounting elements 111 and 112.

Then, as shown at 702, corner mounting element 111 is adjusted to fit the width of camera equipped user device 501.

Then, as shown at 703, hinge 122 is opened from a folded position to an open position so extendable shaft 120 may be used to hold mounting structure 110.

Then, optionally, as shown at 704, extendable shaft 120 is extended to increase the distance between camera equipped user device 501 and the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant self-photographing mount devices will be developed and the scope of the terms self-photographing and mount device is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A self-photographing mount device for holding a camera equipped user device at a distance from a user, comprising:
    a mounting structure having at least two mounting elements for mounting a camera equipped user device in parallel to a mounting plane by holding at least two
    an extendable shaft having a handle at a proximal end thereof; and
    a hinge unit connected to said mounting structure and mounted to allow pivotal rotation of said extendable shaft from a folded position in parallel to a mounting plane to an open position;
    when in said folded position, said extendable shaft is parallel to said mounting plane; and
    when in said open position, said extendable shaft forms a wide angle with said mounting plane;
    wherein said extendable shaft is extended by having an inner shaft moving inside said extendable shaft to create telescopic movement so when in said folded position, said inner shaft is inside said extendable shaft and when said extendable shaft is in said open position, said inner shaft is protruding from said extendable shaft, wherein said handle having a non-circular cross-sectional profile to prevent said extendable shaft from rolling while being held by a user.

2. The device of claim 1, wherein said hinge is adjacent to a side wall of said mounted camera equipped user device when said mounted camera equipped user device is mounted by said mounting structure.

3. The device of claim 1, wherein said camera equipped user device is a mobile phone.

4. The device of claim 1, wherein said camera equipped user device is a pocket camera.

5. The device of claim 1, wherein said extendable shaft comprises at least one button to operate said camera equipped user device.

6. The device of claim 1, wherein said hinge is locked in said open position and in said folded position by a fastener.

7. The device of claim 1, wherein said mounting structure comprises:
    a first corner mounting element;
    a second corner mounting element linearly moveable along a line to adjust at least one of a width and a length of said camera equipped user device; and
    a diagonal support element connecting between said first and second corner mounting elements and diagonally adjacent to a back of said camera equipped user device, said diagonal support element is linearly moveable along a line to adjust a diagonal length of said camera equipped user device.

8. The device of claim 7, wherein at least one of said first corner mounting element, said second corner mounting element and said diagonal support element is locked by a fastener.

9. The device of claim 7, wherein at least one of said first corner mounting element, said second corner mounting element and said diagonal support element is locked by a mechanism having discrete possible positions along a line.

10. The device of claim 7, wherein at least one of said first corner mounting element, said second corner mounting element and said diagonal support element is locked by a spring mechanism and by resistance created by said mounted camera equipped user device.

11. The device of claim 7, wherein said second corner mounting element is linearly moveable along a line by moving inside a track.

12. The device of claim 7, wherein said diagonal support element is linearly moveable along a line by including an inner diagonal element moving inside an outer diagonal element.

13. The device of claim 7, wherein at least one of said first and second corner mounting elements comprises two perpendicular straight segments, each one of said straight segments is adjacent and parallel to a side wall of said mounted camera equipped user device.

14. A self-photographing mount device for holding a camera equipped user device at a distance from a user, comprising:
 a mounting structure for mounting a camera equipped user device, comprising:
  a plurality of mounting elements; and
  a support element connecting between said plurality of mounting elements parallel to a back of said camera equipped user device when said camera equipped user device is mounted in said mounting structure; and
 an extendable shaft having a handle at a proximal end thereof, connected to said mounting structure by a hinge allowing a pivotal rotation of said extendable shaft from a folded position in parallel to a mounting plane to an open position;
 when in said folded position, said extendable shaft is adjacent and parallel to said mounting plane; and
 when in said open position, said extendible shaft forms a wide angle with said mounting plane;
 wherein said mounting plane is substantially to said back of said a equipped user device;
wherein when in said folded position, said extendable shaft is about parallel and adjacent to said support element and when in said open position, said extendible shaft forms a wide angle with said mounting plane.

\* \* \* \* \*